(12) United States Patent
M G et al.

(10) Patent No.: US 11,507,623 B2
(45) Date of Patent: Nov. 22, 2022

(54) INHERITANCE IN DYNAMIC HIERARCHICAL SYSTEMS

(71) Applicant: SAP SE, Walldorf (DE)

(72) Inventors: Raghavendra Rao M G, Walldorf (DE); Maximilian Stefanac, Karlsruhe (DE)

(73) Assignee: SAP SE, Walldorf (DE)

( * ) Notice: Subject to any disclaimer, the term of this patent is extended or adjusted under 35 U.S.C. 154(b) by 296 days.

(21) Appl. No.: 16/810,606

(22) Filed: Mar. 5, 2020

(65) Prior Publication Data

US 2021/0279280 A1    Sep. 9, 2021

(51) Int. Cl.
*G06F 16/901* (2019.01)
*G06F 16/2455* (2019.01)
*G06F 16/22* (2019.01)

(52) U.S. Cl.
CPC ...... *G06F 16/9024* (2019.01); *G06F 16/2246* (2019.01); *G06F 16/2272* (2019.01); *G06F 16/24556* (2019.01)

(58) Field of Classification Search
None
See application file for complete search history.

(56) References Cited

U.S. PATENT DOCUMENTS

| | | | |
|---|---|---|---|
| 6,910,044 B2 | 6/2005 | Weinberg et al. | |
| 7,734,601 B2 | 6/2010 | Weber et al. | |
| 8,732,655 B2 | 5/2014 | Pfeifer | |
| 8,839,186 B2 | 9/2014 | Day | |
| 9,311,082 B2 | 4/2016 | Bonev et al. | |
| 9,411,555 B2 | 8/2016 | Pfeifer et al. | |
| 9,449,062 B2 | 9/2016 | Latzina | |
| 9,569,869 B2 | 2/2017 | Hesse et al. | |
| 9,697,254 B2 | 7/2017 | Paradies et al. | |
| 9,787,705 B1* | 10/2017 | Love | G06F 16/9024 |
| 9,934,324 B2 | 4/2018 | Paradies et al. | |
| 10,394,855 B2 | 8/2019 | Fischer et al. | |
| 10,503,781 B2 | 12/2019 | Paradies et al. | |
| 10,546,021 B2 | 1/2020 | Fischer et al. | |
| 2017/0147709 A1* | 5/2017 | Ganz | H04L 65/403 |
| 2018/0150495 A1 | 5/2018 | Hoff et al. | |
| 2019/0392023 A1* | 12/2019 | DeRose | H04L 41/22 |

OTHER PUBLICATIONS

Schmidt, Desmond & Robert Colomb, "A Data Structure for Representing Multi-Version Texts Online", Elsevier Ltd., Int. J. Human-Computer Studies 67 (2009), pp. 497-514. (Year: 2009).*

(Continued)

*Primary Examiner* — Scott A. Waldron
(74) *Attorney, Agent, or Firm* — Klarquist Sparkman, LLP

(57) ABSTRACT

Methods and apparatus are disclosed for representing a dynamic hierarchical system as a composite graph data structure. Members of a system are represented as primary nodes of a tree. Multiple system states have respective trees, which can be overlaid to obtain a composite graph. The composite graph can be augmented with secondary nodes for member attributes, and further nodes for state-dependent values of the attributes. Methods of processing bottom-up, top-down, and filtered queries are disclosed. Applications to military, manufacturing, and communication networks are provided.

20 Claims, 10 Drawing Sheets

(56) References Cited

OTHER PUBLICATIONS

Goodrich, Michael & Roberto Tamassia, "Algorithm Design and Applications", 2015, Wiley & Sons, Inc., Chapter 13, pp. 353-396. (Year: 2015).*

"UI Element Hierarchy", Sap Blogs, 4 pages, downloaded from https://blogs.sap.com/2012/04/11/ui-element-hierarchy/ (document marked Apr. 2012).

Marson, "The SuccessFactors Employee Central Organization Structure", SAP Blogs, 15 pages, downloaded from https://blogs.sap.com/2014/10/28/the-successfactors-employee-central-organization-structure/ (document marked Oct. 2014).

"Merchandise Category: Merchandise Category Hierarchies", downloaded from https://help.sap.com/viewer/469435272c164c498961b5f76fdc6788/6.00.31/en-US, pp. 1-4 (document marked Feb. 2020).

* cited by examiner

INHERITANCE IN DYNAMIC HIERARCHICAL SYSTEMS

BACKGROUND

Rooted trees are widely used to represent hierarchical entities or data. However, tree organization is often static, whereas there are numerous applications in which relationships between entities can be dynamic. Accordingly, there remains a need for improved technologies to deal with dynamic hierarchies.

SUMMARY

In summary, the detailed description is directed to various innovative technologies for querying a dynamic hierarchical system. Examples of the disclosed technology represent the system with a composite graph data structure, and provide query methods on the composite graph data structure.

In certain examples, the disclosed technologies can be implemented as a method performed by a computer. A composite graph data structure representing a system is built. The composite graph data structure includes multiple primary nodes which represent respective components of the system. The primary nodes are organized as distinct rooted trees, for respective states of the system. The primary nodes are associated with data items which are values of respective attributes of the primary nodes. A query is received from a client. The query is targeted to a given node of the primary nodes in a given state of the states. The given node is not a root of the given state's rooted tree. The given node has an inheritance path in the respective rooted tree of the given state. The inheritance path includes first nodes of the primary nodes. A query response is initialized and the inheritance path is traversed. Data items associated with the first nodes are used to update the query response. The query response is transmitted to the client.

In some examples, first nodes are traversed in order from the given node to the root. The rooted trees for two or more states, or for all states, can share a common root node. The composite graph data structure can include multiple secondary nodes directly coupled by secondary edges to respective primary nodes. The secondary edges can be independent of the states. Each secondary node can represent an attribute of the primary node to which the secondary node is directly coupled. The composite graph data structure can also include multiple value nodes directly coupled by value edges to respective secondary nodes. Each value node can represent a value of the attribute represented by the secondary node to which the value node is directly coupled. At least two of the value edges can be dependent on the states. The query response can include a set. The operation of using data items to update the query response can include aggregating the data items into the set. The query can extend to other states of the system besides the given state, and the method can further include performing the traversing and the updating for the other given states. The traversing and updating can utilize the respective inheritance paths and data items for each of the other states.

In certain examples, the disclosed technologies can be implemented as computer-readable media storing instructions which, when executed by one or more hardware processors, cause the hardware processors to perform the following actions. A composite graph data structure representing a system is received. The composite graph data structure includes multiple primary nodes organized as distinct trees for respective states of the system. The primary nodes represent respective components of the system and are associated with data items which are values of attributes of the primary nodes. A query from a client is received. The query is for a given component of the system in a given state of the system, the given component being represented by a given primary node that is not a leaf node of the given state's tree. The given node has a subtree for the given state. A query response is initialized, and the subtree rooted at the given node is traversed. Data items associated with the primary nodes of the subtree are used to update the query response. The query response is transmitted to the client after completion of the traversal.

In some examples, the trees can be rooted trees sharing a common root node. The given node can be a root of the given state's tree. The composite graph data structure can include multiple secondary nodes directly coupled by secondary edges to respective primary nodes. The secondary edges can be independent of the states. Each secondary node can represent an attribute of the primary node to which the secondary node is directly coupled. The composite graph data structure can also include value nodes directly coupled by value edges to respective secondary nodes. Each value node can represent a value of the attribute represented by the secondary node to which the value node is directly coupled. At least two of the value edges can be dependent on the states. The query response can be a count, and the updating the query response can include summing data items into the count.

In certain examples, the disclosed technologies can be implemented as a system including one or more hardware processors with coupled memory, and computer-readable media storing instructions executable by the one or more hardware processors. The instructions include first, second, third, and fourth instructions. The first instructions, when executed, cause nodes or edges of a composite graph data structure to be retrieved. The composite graph data structure includes multiple primary nodes organized as distinct respective rooted trees for respective states. The second instructions, when executed, cause a subtree of a given rooted tree to be traversed. The third instructions, when executed, cause successive nodes joining a given node to its root node to be traversed, within the composite graph data structure. The fourth instructions, when executed, cause queries from one or more clients to be received, and, after processing each of the queries using the composite graph data structure, corresponding query responses to be transmitted to a corresponding client.

In some examples, additional instructions, when executed, can cause a new rooted tree, for a new state, to be added to the composite graph data structure. Two of the states can correspond to a common operating mode of the nodes, at distinct respective times. Further, two of the states can correspond to distinct respective operating modes of the nodes, at a common time.

The foregoing and other objects, features, and advantages of the invention will become more apparent from the following detailed description, which proceeds with reference to the accompanying figures.

DETAILED DESCRIPTION

Introduction and Overview

Figure 1:
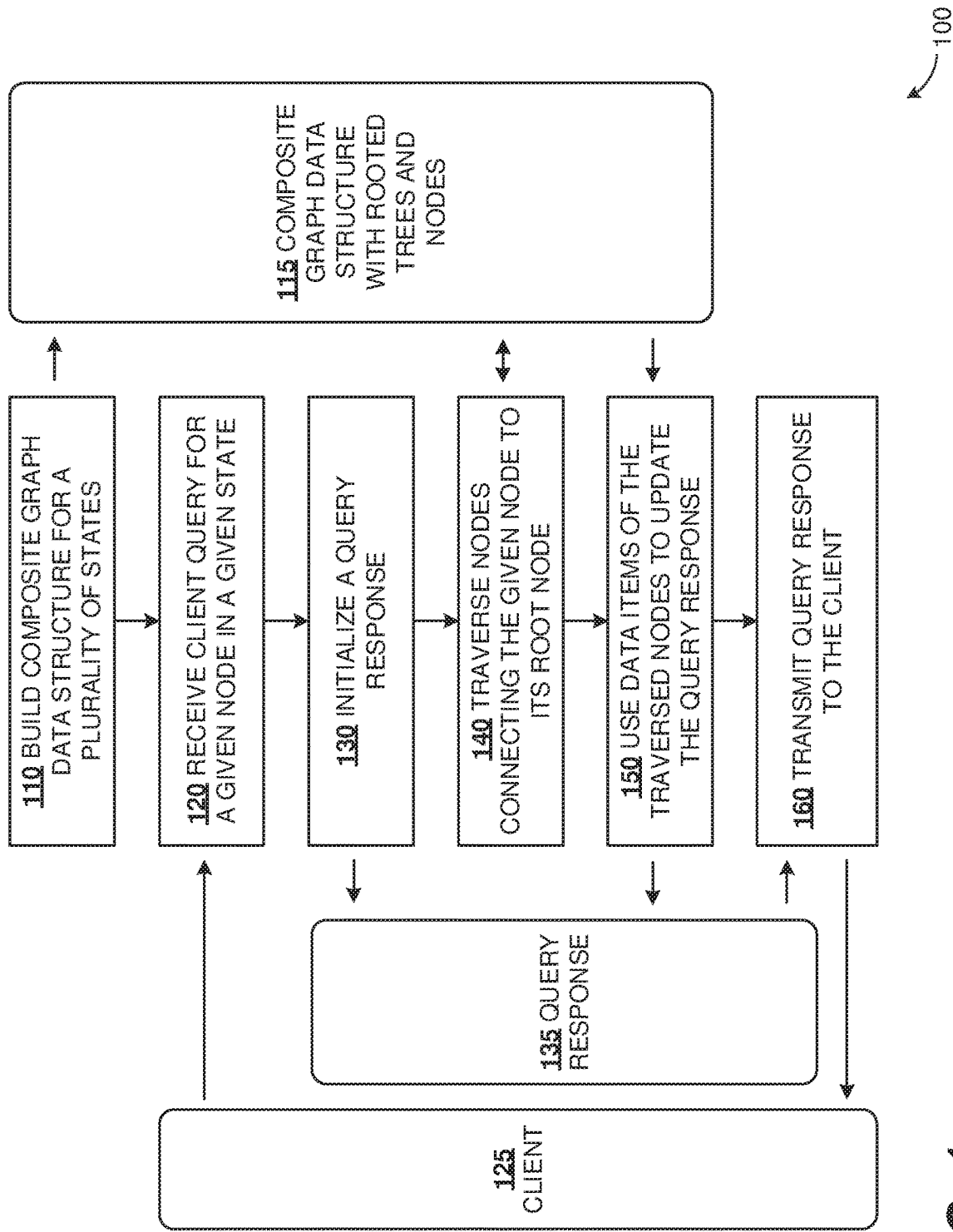
FIG. 1 is a flowchart of an example method for processing a request with a data structure incorporating multiple states of a system, according to the disclosed technologies.

Hierarchically organized systems are widespread. In many applications, the system affords a degree of flexibility in how the constituent members of the system are organized and how their attributes are configured. A particular organization or configuration can be chosen to achieve desired or optimum performance in a particular state. For example, in a military battalion, a particular organization can offer a quick response time when a Notice to Move is received in a combat readiness state, while another configuration can offer a better variety of supplies when the battalion is at standby. As another example, a manufacturing plant can have different states for manufacturing 2-door or 4-door variants of an automobile. Still further, a communication network can be configured in different states according to time of day and variations in traffic distribution.

Managing and analyzing flexible systems can be challenging, especially as the numbers of system members and states increase. Additional complexity is introduced because many systems are heterogeneous in nature and can also be time varying. Particularly, it can be difficult to find attributes of interest, which could be scattered among system members. The disclosed technologies provide a unified approach for building a single extensible data structure to represent such a system, which can associate attributes and their values with respective system members. Common software tools can be utilized to build, configure, query, or analyze a graph data structure with heterogeneous members and time-varying characteristics across a wide range of applications.

The disclosed technologies utilize a graph data structure to model such a system, with the constituent members of the system represented by respective primary nodes of the graph. Various organizations of the members can be represented as respective subgraphs (in particular, trees), which can be combined to form a composite graph. Additional nodes of the graph data structure can be defined for attributes of each member and for the values of these attributes in respective states of the modeled system. The graph data structure can provide an agile representation of a system, where nodes can easily be added, modified, or rearranged, and states can be added or removed over the lifetime of a modeled system.

The composite graph data structure provides numerous advantages over conventional techniques. In one aspect, storage can be saved by having a single graph rather than multiple distinct graphs for respective configurations. Further, conventional approaches can require reconfiguration of a database when the configuration of an underlying system is changed. In contrast, the disclosed technologies allow a seamless transition from one configuration to another, without any change to the composite graph or an underlying database. Even addition of a new configuration can be easily accomplished by adding links or defining values of attributes, without instantiation of any new data structures, tables, or models. Thus, response times and computation times for making updates can be significantly reduced as compared to conventional approaches. Furthermore, queries (including ad-hoc queries or queries dynamically formed at run-time can be executed without requiring large, resource-consuming operations on an underlying database. In another aspect, the composite graph data structure provides a unified single point of management for a reconfigurable system, allowing system changes to be consistently implemented across all configurations of a system, and reducing risks of inconsistencies or loss of synchronization between different configurations. The rooted tree organization also permits more efficient traversal of system components in response to a query, as compared to a tabular organization where every component may need to be checked to see whether it is within scope of a particular query. Thus, the rooted trees embedded within a composite graph data structure offer more efficient computation for responding to client queries.

Queries of particular interest can include bottom-up queries, e.g. to report attributes of a given primary node inherited from its successive parent nodes in a given state. Other queries can include top-down queries, e.g. to report attributes or totals across an entire subtree of a given primary node, in a given state. Further queries can incorporate filters, so that only attributes or nodes meeting specified criteria are considered while generating a response to a query. Additional queries can include multiple states within their scope. For example, a query for a battalion can collect an aggregated list of all suppliers used by the battalion across all states. Results can variously be presented as sets, atomic data, data structures, or reports, as appropriate for responding to particular queries.

Terminology

The usage and meaning of all quoted terms in this section applies throughout this disclosure unless clearly indicated otherwise or repugnant to the context. The terminology below extends to related word forms.

In the context of graphs and graph data structures, an "attribute" is a feature associated with one or more items (such as nodes or edges) in the graph. An attribute can optionally have a value. While attributes can often be associated with respective nodes, this is not a requirement. A single attribute can be associated with (shared by) multiple nodes. An attribute can also be associated with an edge, a subset of a graph (sometimes dubbed "subgraph" or "subnet"), an entire constituent graph of a composite graph, or the entire composite graph. In examples, nodes representing modeled entities can be considered as primary entities, while attributes can be incorporated as secondary nodes in the graph data structure. An attribute can have a value, which can be different for different states or constituent graphs. In a graph data structure, values can be incorporated as tertiary nodes, directly coupled to their respective attributes. An attribute and its values can have a type similar to datatypes used in computer technologies, which can be an atomic type such as integer, floating point number, string, binary, or categorical, or a more complex type such as any data structure. In examples where a graph of primary nodes is a tree, the graph augmented with secondary or tertiary nodes can also be a tree but need not be a tree.

A "client" is a hardware or software computing entity that uses a resource provided by another hardware or software computing entity dubbed a "server."

A "graph" is a set of two or more nodes and a set of one or more edges joining respective pairs of the nodes. The edges can be directed (e.g. where one node is dependent on or follows from another node, often represented with single-ended arrows) or undirected (often represented with arrow-free lines or bidirectional arrows). A graph can be a tree or a directed acyclic graph (DAG), but need not be either. A graph in which a path exists between every pair of nodes is a "connected graph." The graphs described herein are often connected graphs. A graph is a logical structure and can be implemented using any of various types of data structures to track nodes and edges (e.g. linked lists, arrays). A pair of nodes joined by an edge can be described as "directly coupled." A graph or a graph data structure is a model of some other entities and the relationships therebetween. In examples, a graph data structure can include "primary nodes" representing respective modeled entities, as well as other nodes to represent e.g. attributes or values associated with the modeled entities. A graph of just primary nodes is dubbed a "primary graph." The modeled entities can be components of a system. The entities or system can be of varying types, or even mixed types, for example tangible, organizational, or software. A "composite graph" is a graph composed of multiple underlying or constituent graphs, for example by overlaying the underlying graphs. A composite graph can retain sufficient information to enable extracting or traversing each of the constituent graphs: that is, edges or nodes can be tagged to indicate which constituent graphs they form part of. The constituent graphs can represent respective states of a modeled system. The graphs described herein can be represented or stored as a data structure, and the term graph extends to such a data structure, such as a "composite graph data structure."

An "inheritance path" is a unique path within a tree leading from a given node (other than the root) to the root node, with any intervening node being the parent of its preceding node. Where used without qualification, the inheritance path can include both the given node and the root node, however this is not a requirement. Generally, descriptions of an inheritance path herein are likewise applicable to an "exclusive inheritance path" which excludes the given node. An exclusive inheritance path of a given node can be the (inclusive) inheritance path of its parent node.

A "result" or "query response" refers to information conveyed in response to a query. The result can be a single data item, or a set of zero or more data items. That is, an empty set with zero members can be a valid result. As used herein, a "simple set" is an unordered collection of distinct members, such as {1, 2, "green"}. A "multiset" is an unordered collection of members which need not be distinct, such as {3, "blue", "blue"}. A "tuple" is an ordered collection of members, e.g. triples ⟨3, "blue", "blue"⟩ and ⟨"blue", 3, "blue"⟩ are distinct. The term "set" can refer to a simple set, multiset, tuple, or another collection of data items. Any kind of set with 1, 2, 3, . . . members can be described with terms such as "singlet," "pair," "triple," and so forth. As a single data item, a result can be an atomic datatype, such as number, string, or categorical type, or can be a data structure or other complex datatype. A result can be presented as a report, a message, or binary data.

A "state" refers to a configuration of a system of entities associated with a respective graph of relationships between the entities. The entities can have attributes with values that depend on the state, but this is not a requirement. Distinct states of the system can have distinct graphs of primary nodes, or distinct augmented graphs including secondary (attribute) and tertiary (values) nodes. Particularly, a pair of distinct states can have identical graphs of primary nodes but distinct augmented graphs. In other examples, a pair of distinct states can have distinct primary graphs, with identical values of all attributes. In further examples, both primary graphs and values can differ. Distinct states can reflect differences in conditions or environment of the system, or differences in time, or both. States can be organized hierarchically, with some states having one or more substrates, and can form a set of rooted trees.

In the context of queries and corresponding responses, the terms "receive" and "transmit" refer to communication over a network, which can be in the form of a message. The communication can be electromagnetic, e.g. over wired, wireless, or optical media, but this is not a requirement.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution.

"Traversal" refers to the operations of traveling from node to node along edges of a graph. Optionally, additional functions can be performed at all or some of the traversed nodes. For example, during traversal of a graph of data items, those data items having valid entries in a cache can be collected. Traversal of an inheritance path can be performed top-down, bottom-up, or in a non-sequential order. Traversal of a subtree can be performed depth-first, breadth-first, or in another order. In examples, a traversal can reach all nodes of a graph, or all nodes that are reachable from a given starting node.

A "rooted tree" (or simply "tree") is a graph in which one of the nodes is a root node, and every other node of the tree has a unique parent node that can ultimately be traced back to the root node. Each edge of the graph directly couples a (child) node to its unique parent node. A tree can have a minimum of two nodes joined by one edge. The terms "parent node" and "child node" have meaning relative to each other, i.e. the parent node can itself be a child of another node, and the child node can be a parent of a further node. A node which is not parent of another node (i.e. it has no child nodes) can be dubbed a "leaf" or "leaf node." Two children of a common parent node can be dubbed "siblings." As a matter of convention, a tree can be considered as organized on a sequence of levels, with the root node at level 0 or level 1 at the top of the tree, and level numbers increasing going down the tree until leaf nodes are reached. A parent and its child can be on successive levels. The collection of nodes descended from a given node is a "subtree" of the given node. Where used without qualification, a subtree includes its root node. A subtree with two or more nodes is a tree. Descriptions of a subtree herein can also be applicable to an "exclusive subtree" which excludes the subtree's root. Inasmuch as a graph can be represented or stored as a data structure, the term tree extends to the data structure embodying a tree graph.

First Example Method

FIG. 1 is a flowchart 100 of an example method for processing a request with a data structure incorporating multiple states of a system. In this method, a composite graph data structure is built for multiple states. A query is processed by suitably traversing nodes of the graph of a given state, which is embedded within the composite graph data structure. This method can be applied to a query on a given node asking about attributes inherited from the nodes (parent, grandparent, . . . root) in its ancestral chain, i.e. above the given node in the tree. The scope of such a query can extend to include the given node itself.

The method is described in context of a client 125 that can issue a request and receive a response; the query response 135 generated by the illustrated method; and a composite graph data structure 115, which can store information of a system across multiple states as described herein.

At process block 110, a composite graph data structure 115 is built for multiple states of a system, the composite graph data structure including multiple primary nodes. For each state, the primary nodes can be organized as respective rooted trees, which can be contained within the composite graph data structure 115. The composite graph data structure can represent a system or collection of related entities as described herein. A composite graph data structure can be built by combining edges (tagged by state) for the states' respective primary trees; incorporating secondary nodes and edges joining the secondary nodes to primary nodes; and incorporating value nodes (also tagged by state) and edges joining the value nodes to the secondary nodes.

At process block 120, a query for a given primary node of the data structure 115 can be received from a client 125. The query can be directed, expressly or implicitly, to one or more given states of the data structure 115. For simplicity, the description proceeds for a single given state. The given primary node can be other than a root node for the particular (constituent) tree of the given state. Responsive to the query, a response 135 can be initialized at process block 130. In examples, where the response 135 is to be a set, the response can be initialized to an empty set (including an empty tuple). In other examples, where the response 135 is to be a count, the response can be initialized to zero. In further examples, the response 135 can be initialized to a non-zero default value, or to a data structure having default or undefined values for various fields of the data structure.

At process block 140, one or two or more primary nodes can be traversed, on the inheritance path of the given primary node.

At process block 150, attribute values or other data items of the traversed nodes can be used to update the response 135. In varying examples, data items can be collected into a response set 135, added to a response count 135, or otherwise applied to calculate or form the response 135. In further examples, data items, attributes, or values can be selected according to a condition or filter. Although shown separately, the using and updating of process block 150 can be performed concurrently with the traversing of process block 140. That is, each traversed node can be evaluated to update the response 135 before the traversal of block 140 proceeds to another node.

Finally, at process block 160, after completion of process blocks 140, 150, the query response 135 can be transmitted to the client 125. The response can be transmitted in binary or human-readable form; as data, a message, or a report.

The method of FIG. 1 can be implemented with numerous additional extensions or variations. For example, the query can specify a criterion or filter that limits the attributes, values, or nodes that contribute to the result. Such a criterion or filter can be incorporated into one or both of process blocks 140, 150. To illustrate, the query can indicate that only one particular attribute (e.g. "Commanding Officer") is to be collected, or that only values within a specified range are of interest, or that only certain classes of nodes are of interest.

Example Composite Graphs

FIGS. 2A-2G are diagrams illustrating various graphs and states of an example system according to the disclosed technologies. While graphs are described herein for convenience of illustration, the described features and methods associated with such graphs are applicable, in embodiments of the disclosed technologies, to any data structures implementing such graphs in tangible memory, non-volatile storage devices, or other computer-readable media.

Figure 2A:
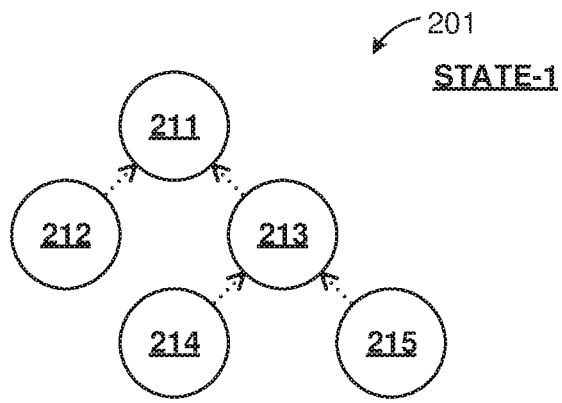
FIGS. 2A-2G are diagrams illustrating various graphs and states of an example system according to the disclosed technologies.
Figure 2B:
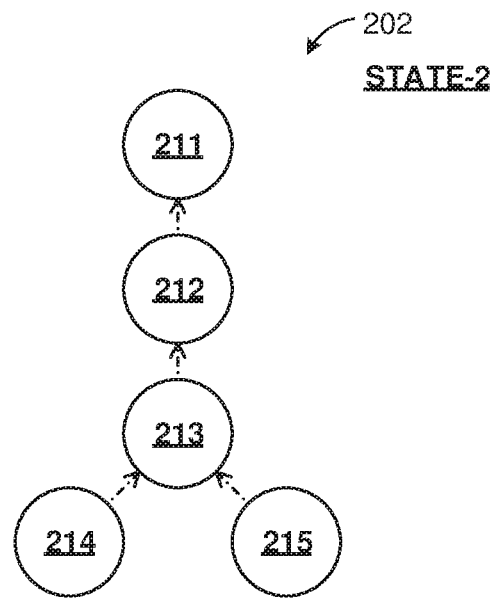
Figure 2C:
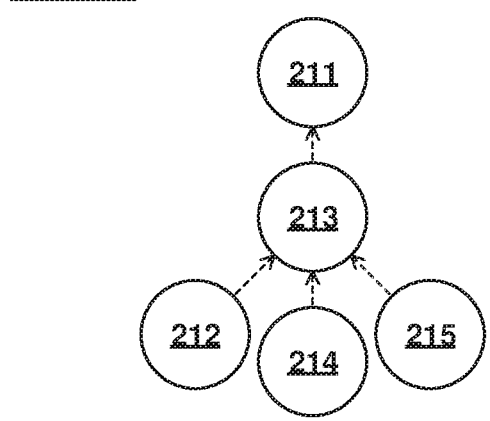

FIG. 2A illustrates a primary tree 201 for a first state (State-1) of the illustrated system. Node 211 is a root, with child nodes 212, 213. Leaf nodes of this state are 212, 214, 215. As a primary tree, only primary nodes 211-215 are illustrated. For State-1, the edges are shown as dotted line arrows. As a matter of convention, the arrows point from a child node to its parent node, however this does not limit the disclosed methods which, in varying examples, can follow edges in either direction. FIGS. 2B-2C illustrate primary trees 202, 203 for additional respective states (State-2, State-3) of the same primary nodes 211-215. That is, the underlying system represented by primary trees 201-203 is the same, albeit in different states with differing relationships between the entities represented by the primary nodes 211-215. In FIG. 2B, node 212 is an intermediary node between node 213 and root node 211. Only nodes 214, 215 are leaf nodes. For State-2, the edges of primary tree 202 are shown as arrows with dash-dot lines. In FIG. 2C, node 212 is a child of node 213, rather than a child of root 211 as in the other two states of FIGS. 2A-2B. For State-3, edges are shown with dashed line arrows.

Figure 2D:
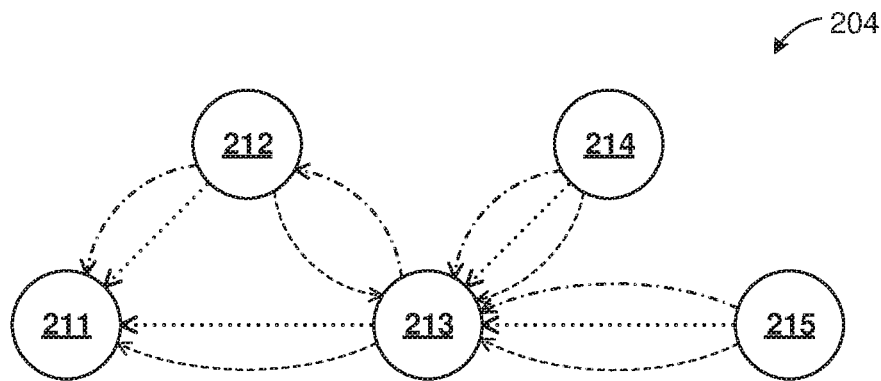

FIG. 2D is a composite primary graph 204 of the same primary nodes 211-215, which can be formed by overlaying the various edges of trees 201-203 on a single graph. For example, dotted and dash-dot arrows from node 212 to node 211 reproduce the child-parent relationship between these nodes in trees 201, 202, while dashed arrow from node 212 to node 213 reflects the child-parent relationship between these nodes in tree 203. Graph 204 similarly captures other edges from primary trees 201-203. Composite graph 204 contains four edges from each of trees 201-203, or 4×3=12 edges total. While composite graph 204 can be built from primary trees 201-203, composite graph 204 itself need not be a tree. The layout of nodes in graph 204 differs from the positioning of nodes 211-215 in FIGS. 2A-2C. However, graphs are defined by their nodes and edges, and not by how an illustration of the graph is arranged. Thus, repositioning graph nodes in an illustration does not change the graph, so long as the connectivity between nodes is unchanged.

Figure 2E:
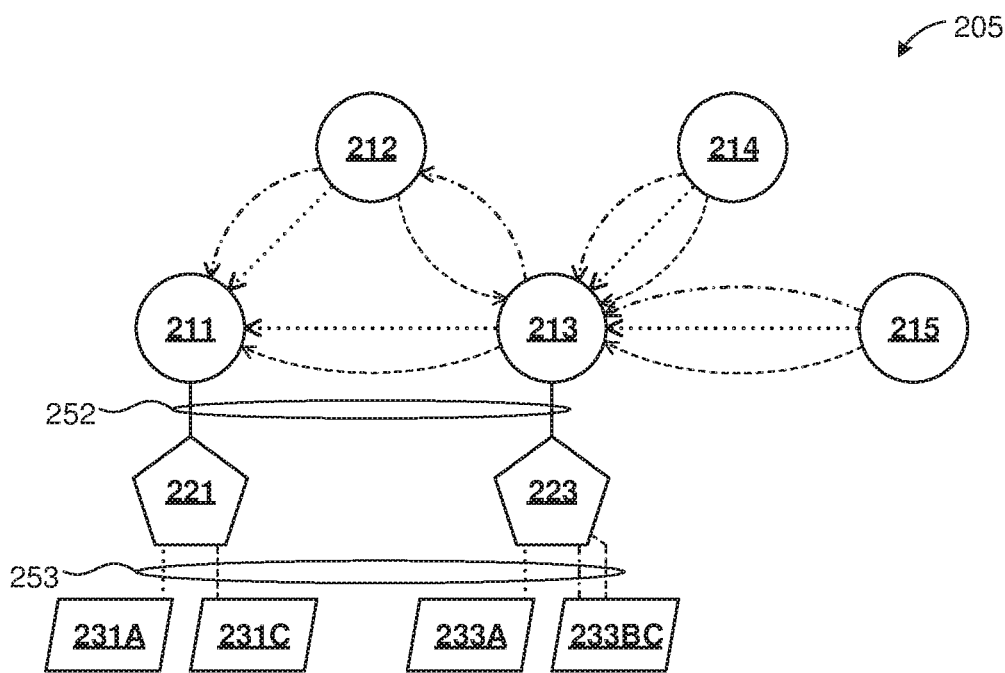

FIG. 2E is a composite graph 205 which includes the nodes and edges of graph 204, together with secondary nodes 221, 223 for attributes of primary nodes 211, 213 respectively, and tertiary value nodes 231A, 231C, 233A, 233BC for values of the respective attributes 221, 223 to which they are connected. The edges 252 between attribute nodes and primary nodes can be independent of state, and are shown as a solid line. That is, the graph data structure illustrated in FIG. 2E has multiple secondary nodes 221, 223 directly coupled to respective primary nodes 211, 213 by the edges 252, and each secondary node 221, 223 can represent an attribute of its respective primary node 211, 213.

Edges 253 between value nodes and attribute nodes can be dependent on state, and are shown dotted, dash-dotted, or dashed to conform with the styles of graphs 201-203 for their respective states. That is, the graph data structure illustrated in FIG. 2E has multiple value nodes 231A, 231C, 233A, 233BC directly coupled to respective secondary nodes 221, 223 by respective by value edges 253. Each value node 231A, 231C, 233A, 233BC can represent a value, for one or more states, of the attribute represented by respective coupled secondary node 221, 221, 223, 223. For example, value 231A is effective for State-1 but not State-2 or State-3, and value 231C is effective for State-3. Edges 252, 253 are illustrated as undirected edges, however this is not a requirement. In other examples, some or all of edges 252, 253 can be regarded as directed edges.

Figure 2F:
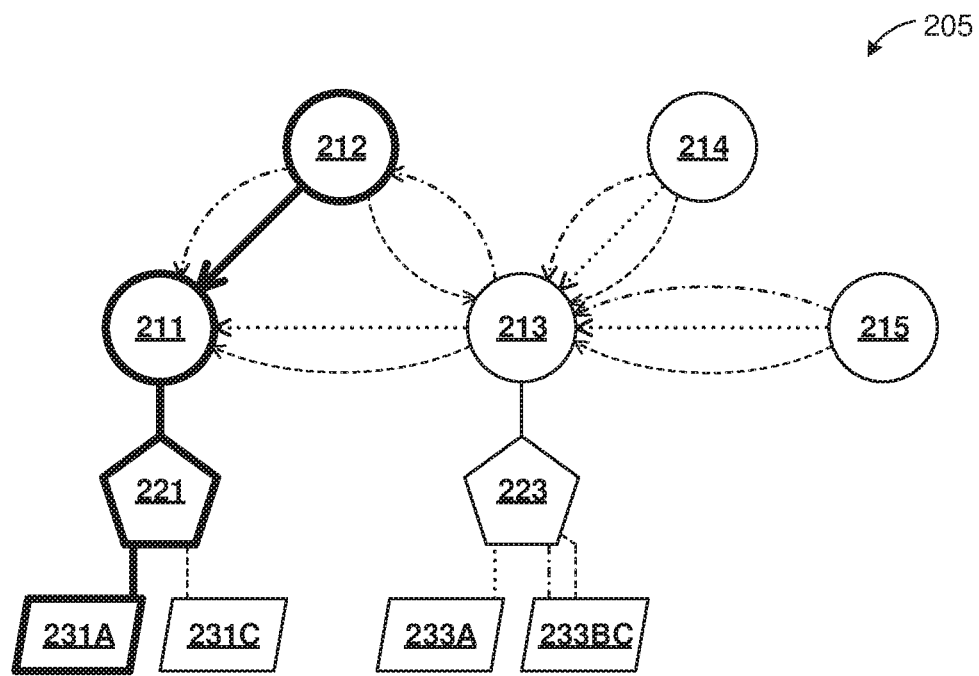
Figure 2G:
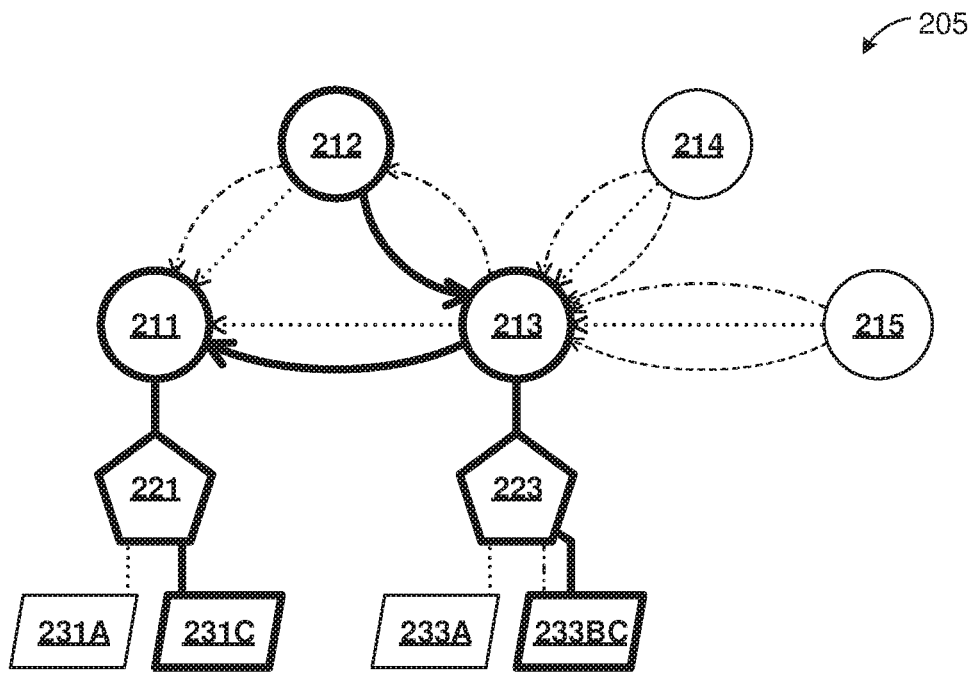

As described herein, queries can be processed on the composite graph 205. FIGS. 2F-2G illustrate handling of queries according to the first method described in context of FIG. 1. The query of FIG. 2F can be "collect all attributes of node 212 and its inheritance path in State-1." The graph 205 of FIG. 2F is unchanged from FIG. 2E, however, for purpose of illustration, the nodes and edges relevant to this query have been shown with bold solid lines. Thus, the query could begin at queried node 212, which has no attributes, and proceed to its parent 211, which has attribute 221 with value 231A in State-1. Because node 211 is the root of tree 201, the traversal of block 140 is complete, and the only data item contributing at block 150 to a result is attribute 221 with value 231A from node 211. Thus, the following result R1 can be assembled and transmitted to a requesting client.

$$R1 = \{\langle N211\ N221\ N231A \rangle\} \qquad (1)$$

In this notation, the result R1 can be a set having a single member which is a tuple. N211, N221, N231A denote data, identifiers, names, or other labels of the entities that may be associated with nodes 211, 221, 231A in a modeled system. Using a manufacturing process flow to illustrate, the primary nodes could be associated with manufacturing stations, and the states could be associated with a particular scheduled shift, e.g. "Shift 3." In this illustration, primary node 211 could be identified as "Station-P," its attribute 221 could be "OperatorName," and value in State-1 could be a data item "John Smith." Accordingly, the result R1 could be R1= {⟨"Station-P", "OperatorName", "John Smith"⟩}. Alternatively, system identifiers can be used for one or more of the tuple elements, such as an employee identifier 1136 for John Smith. Moreover, the result can be presented with more or less fields. A particular query may only require that the values be listed, or only the attributes, or some other group of fields for each traversed node of a primary graph.

In a similar fashion, FIG. 2G illustrates processing of a query such as "collect all attributes of node 212 and its parents in State-3." In State-3, the parents of node 212 are nodes 213, 211, so the bottom-up traversal of block 140 goes from node 212 to 213 to 211. That is, the successive primary nodes can be traversed sequentially from the node 212 specified in the query to the root 211. Along with the traversal 140, data items can be collected at block 150 from attributes 223, 221. The value 231C of attribute 221 in State-3 can be different from the value 231A of attribute 221 in State-1. Accordingly, in this illustration, the following result R2 can be assembled and transmitted to a requesting client.

$$R2 = \left\{ \begin{array}{l} \langle N213\ N223\ N233BC \rangle; \\ \langle N211\ N221\ N231C \rangle \end{array} \right\} \qquad (2)$$

In some examples, the tuple-set of Equation (2) can be stored or transmitted as a matrix or other multi-dimensional array.

FIGS. 2F-2G are merely illustrative of many different queries and traversals that can be performed on composite graph 205. In both FIGS. 2F-2G, the queried node 212 is a leaf node. However, this is not a requirement. A similar query could also be processed for State-2, where node 212 is not a leaf node. For such a query, the traversal 140 could traverse the same primary nodes as in FIG. 2F. However, for State-2, the value of attribute 221 is undefined. According to the implementation, an attribute with undefined value can be returned with a token indicating an undefined value, returning a result R3a:

$$R3a = \{\langle N211\ N221\ \text{Undefined} \rangle\}; \qquad (3a)$$

or by simply ignoring the undefined attribute, and returning an empty result R3b:

$$R3b = \{\ \}. \qquad (3b)$$

In other examples, a query can extend over multiple states. To illustrate, a query such as "collect all attributes of node 212 and its parents in State-1 and State-3" can be processed by performing the traversal and data collection of blocks 140, 150 twice, once for State-1 (according to FIG. 2F) and once for State-2 (according to FIG. 2G), to yield a combined result:

$$R4 = \left\{ \begin{array}{l} \langle \text{State-1}\ N211\ N221\ N231A \rangle; \\ \langle \text{State-3}\ N213\ N223\ N233BC \rangle; \\ \langle \text{State-3}\ N211\ N221\ N231 \rangle \end{array} \right\} \qquad (4)$$

The examples above illustrate results which are aggregated over traversed nodes. In some examples, a result can be a summation over traversed nodes. To illustrate, in a manufacturing workflow, a query can ask how much work in process is present at a given machine (primary node) or ahead of the given machine (successive parent nodes). Then, referring to node 213 of tree 202, manufacturing stations 213, 212, and 211 could have 3, 4, and 5 work pieces respectively in process at a given time, yielding a result R=3+4+5=12. In further examples, the given node can be excluded from the query, e.g. "how much work is ahead of a machine 213," yielding a result, counting just parent nodes 212, 211, of R=4+5=9.

Figures 3A, 3B:
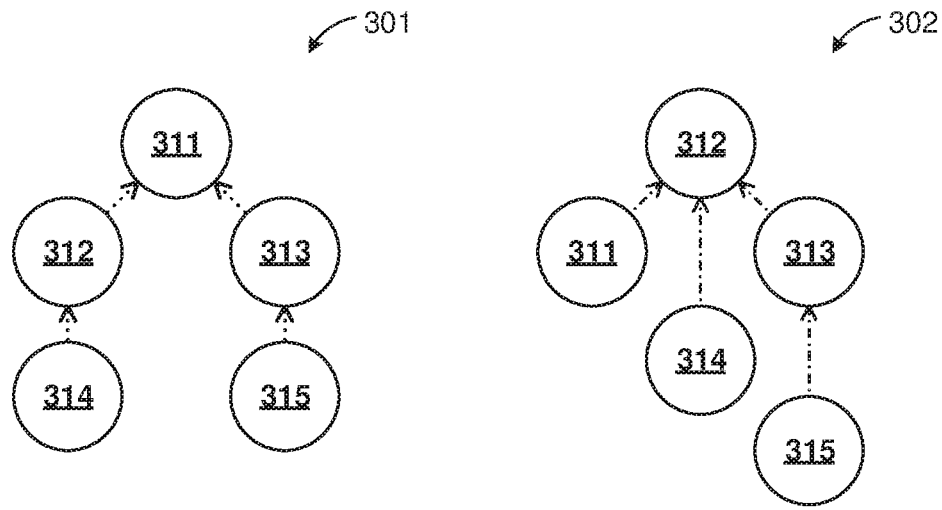
FIGS. 3A-3C are diagrams illustrating further graphs of systems according to the disclosed technologies.
Figure 3C:
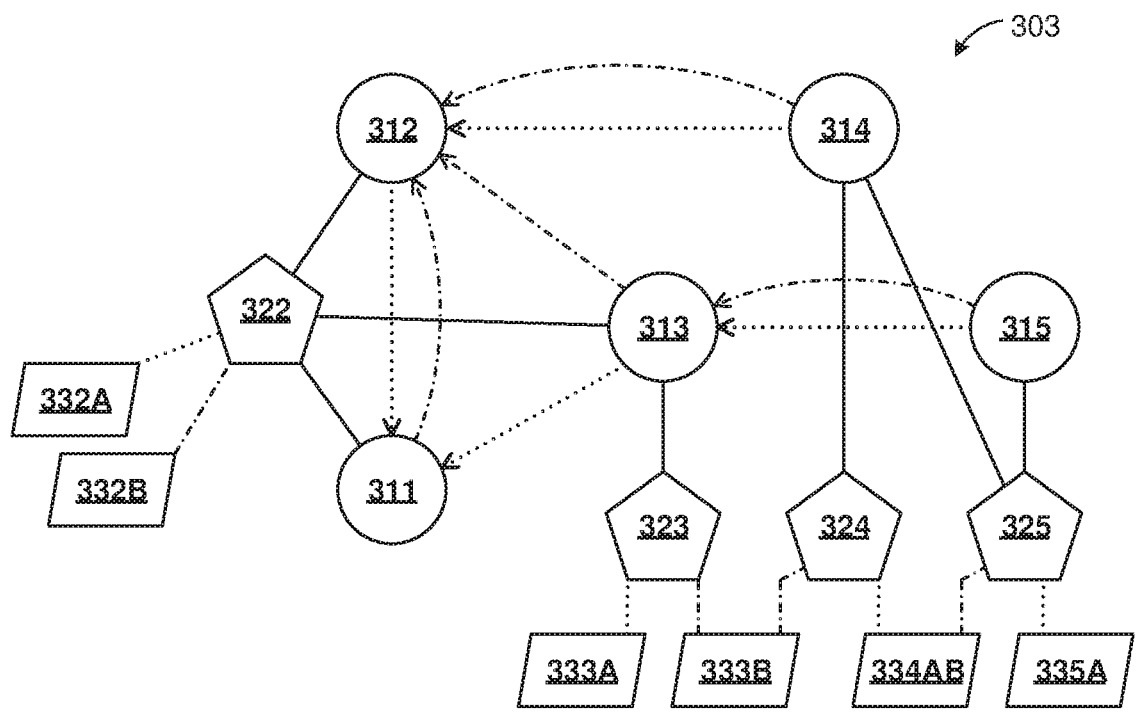

The disclosed composite graphs admit numerous variations. FIGS. 3A-3C are graphs illustrating some additional features which can be provided in varying examples. FIGS. 3A-3B show primary trees 301, 302 for two states of a system with five primary nodes 311-315. Unlike trees 201-203, which all had a common root node, trees 301, 302 have distinct root nodes 311, 312 respectively. FIG. 3C is a composite graph 303 constructed from primary trees 301, 302 with corresponding attributes 322-325 and their values 332A, 332B, 333A, 333B, 334AB, 335A. In composite graph 205, each attribute node was associated with a single primary node, and each value node was associated with a single attribute node. Such a configuration allows flexibility in allocating and managing attributes and values, but other configurations can also be used. For example, attribute node 322 is shared by primary nodes 311, 312 and attribute node 325 is shared by primary nodes 314, 315. Shared attributes can be suitable for primary nodes that are equivalent or interchangeable, and can allow for simpler management of a smaller number of attributes. Similarly, values 333B, 334AB can be shared between two attribute nodes {323, 324} or {324, 325} respectively. Value 333B is assigned to both attribute nodes 323, 324 in a same State-2. However, value 334AB is assigned to one or the other of attributes 324, 325 dependent on the state.

Example Formal Description

A formal description of the graphs and models described herein follows, in Tables 1-3.

Composite Primary Graph

TABLE 1

| Symbol | Description |
|---|---|
| d | A state of a modeled system. |
| D | The set of all states {d}. |
| vp | A primary node. |
| VP | The set of all primary nodes {vp}. |
| ep | A directed edge ⟨v1, v2, d⟩ for a state d, where v1, v2 are child and parent primary nodes joined by edge ep. |
| EP | The set of all edges {ep} among the primary nodes. |
| GP | The composite primary graph, GP = GP(VP, EP). |

Attribute Graph

TABLE 2

| Symbol | Description |
|---|---|
| va | A secondary node. |
| VA | The set of all secondary nodes {va}. |
| ea | An edge ⟨vp, va⟩ joining a secondary node va to a primary node vp. |
| EA | The set of all edges {ea}. |
| GA | A secondary graph, GA = GA(VP∪VA, EA). |

Composite Value Graph

TABLE 3

| Symbol | Description |
|---|---|
| vv | A value node. |
| VV | The set of all value nodes {vv}. |
| ev | An edge ⟨va, vv, d⟩ joining a value node vv to a secondary node va for a state d. |
| EV | The set of all edges {ev}. |
| GV | A composite value graph, GV = GV(VA∪VV, EV). |

With these graphs, the composite graph for a multi-state model or equivalent data structure can be described as GC=GC (VP∪VA∪VV, EP∪EA∪EV). In some examples, the composite graph GC and the composite primary graph GP can be connected graphs, while the attribute graph GA and the composite value graph GV can each comprise a plurality of disjoint subgraphs.

Example Implementations of the First Method

Some additional procedures can be described with pseudocode.

Table 4 provides a pseudocode listing of functions dimensionDependentInheritance( ) and getInheritedAttributes( ) In some examples, functions similar to these can be used to perform portions of the first method, recursively performing a bottom-up traversal of an inheritance path from a specified primary node v0 for a given state d0.

TABLE 4

| | |
|---|---|
| L400 | function dimensionDependentInheritance(vpq, dq): |
| L401 | Initialize RP as empty set |
| L402 | Initialize RA as empty set |
| L403 | Initialize RPAV as empty set |
| L404 | Initialize RPE as empty set |
| L405 | getInheritedAttributes(vpq, dq) |
| L406 | return {RP, RA, RPAV, RPE} |
| L407 | Endfunction |
| L408 | function getInheritedAttributes(vp0, d0): |
| L409 | Add vp0 to RP |
| L410 | Set A1 = getAttributesOfPrimaryNode(vp0) |
| L411 | For each va1 element of A1: |
| L412 | If va1 is not element of RA: |
| L413 | Add va1 to RA |
| L414 | vv1 = getValueOfAttributeNodeInState(va1, d0) |
| L415 | if vv1 is not empty: |
| L416 | Add ⟨vp0, va1, vv1⟩ to RPAV |
| L417 | Endif |
| L418 | Endif |
| L419 | Endfor |
| L420 | vp1 = getHigherLevelPrimaryNode(vp0, d0) |
| L421 | If vp1 is not empty: |
| L422 | Add (vp0, vp1, d0) to RPE |
| L423 | getInheritedAttributes(vp1, d0) |
| L424 | Endif. |
| L425 | Endfunction |

A query received at block 120, for collecting attributes and their values along the inheritance path of primary node vpq for a state dq, can result in a call to function dimensionDependentInheritance( ) at line L400. The initialization of block 130 can be performed at lines L401-L404, where various result sets are initialized. RP is a set of primary nodes traversed along the inheritance path, RA is a set of secondary nodes encountered, RPAV is a set of tuples ⟨ primary node, secondary node, value node⟩ collected during traverse of primary nodes RP, and RPE is a set of edges along the inheritance path of the primary tree for state dq. At line L405, the function getInheritedAttributes( ) is called to recursively perform traversal of the inheritance path and concurrent collection of attributes and their values, as at blocks 140, 150. At line L406, results are returned, as at block 160.

Turning to function getInheritedAttributes( ) the current primary node vp0 is added to RP at line L409, and all attributes of node vp0 are obtained at line L410. Each new attribute va1 is added to RA at line L413, and if a value for this attribute is found at line L414, a tuple ⟨ vp0, va1, vv1⟩ is added to result set RPAV at line L416. Each tuple can be similar to the tuple of R1 in Equation (1). Upon completion of all attributes A1: the parent vp1 of the current node vp0 is obtained at line L420; the primary edge from vp0 to vp1 is added to RPE at line L421; and a recursive call to getInheritedAttributes( ) is made at line L423. The method terminates when the root node is reached and has been processed, i.e. there is no further parent node in the inheritance path. The recursive stack of calls to getInheritedAttributes( ) from line L405 completes, and one or more result sets can be returned at line L406.

The function getAttributesOfPrimaryNode( ) called at line L410 returns all attributes of a current primary node. For example, with reference to FIG. 3C, getAttributesOfPrimaryNode(313) can return 1322, 3231. The function getValueOfAttributeNodeInState( ) called at line L414 returns the value node for a current secondary node for the current state. For example, getValueOfAttributeNodeInState(322, State-1) can return 332A, while getValueOfAttributeNodeInState (225, State-1) can return a null or empty result. The function getHigherLevelPrimaryNode( ) called at line L420 returns the parent node of a current primary node for the current state. For example, getHigherLevelPrimaryNode(313, State-2) can return 312, while getHigherLevelPrimaryNode(313, State-1) can return 311.

Extension for Filters

As an illustration, a query can be restricted to one or more particular attributes, such as "Supplier" or {"Commanding Officer", "Troop Strength"}. Such a filter can be incorporated into the pseudocode example of Table 4 in various ways. The call at line L410 can be modified to getAttributesOfPrimaryNode(vp0, AttributeSet) to return only those attributes meeting a filter criterion. Alternatively, the test at line L410 can be modified to "If (va1 is not element of RA) and (va1 is an element of AttributeSet):" to restrict lines L413-L416 to the desired attribute(s). Other filters on nodes or values can be supported similarly.

Extension for Multiple Dimensions

Table 5 provides a pseudocode listing of function. In additional examples, this or a similar function can be used to extent the implementation of Table 4 for queries covering all states of a modeled system.

TABLE 5

| | |
|---|---|
| L500 | function dimensionIndependentInheritance(vpq): |
| L501 | Initialize RD as empty set |
| L502 | Set D1 = getStatesOfPrimaryNode(vpq) |
| L503 | For each d1 element of D1: |
| L504 | Add d1 to RD |
| L505 | dimensionDependentInheritance(vpq, d1) |
| L506 | Endfor |
| L507 | Endfunction |

A query for collecting attributes and their values along the inheritance path of primary node vpq for all states, can result in a call to function dimensionIndependentInheritance( ) at line L500. A set RD of states is initially empty (line L501) and augmented as each dimension dl is processed (line L504). At line L502, a function getStatesOfPrimaryNode (vpq) is used to search the edges of composite primary graph EP for all edges ep connected to primary node vpq. For example, with references to FIG. 2D, getStatesOfPrimaryNode(213) can return {State-1, State-2, State-3}. At line L505, the previously described function dimensionDependentInheritance( ) can be called once for each discovered state dl.

Second Example Method

Figure 4:
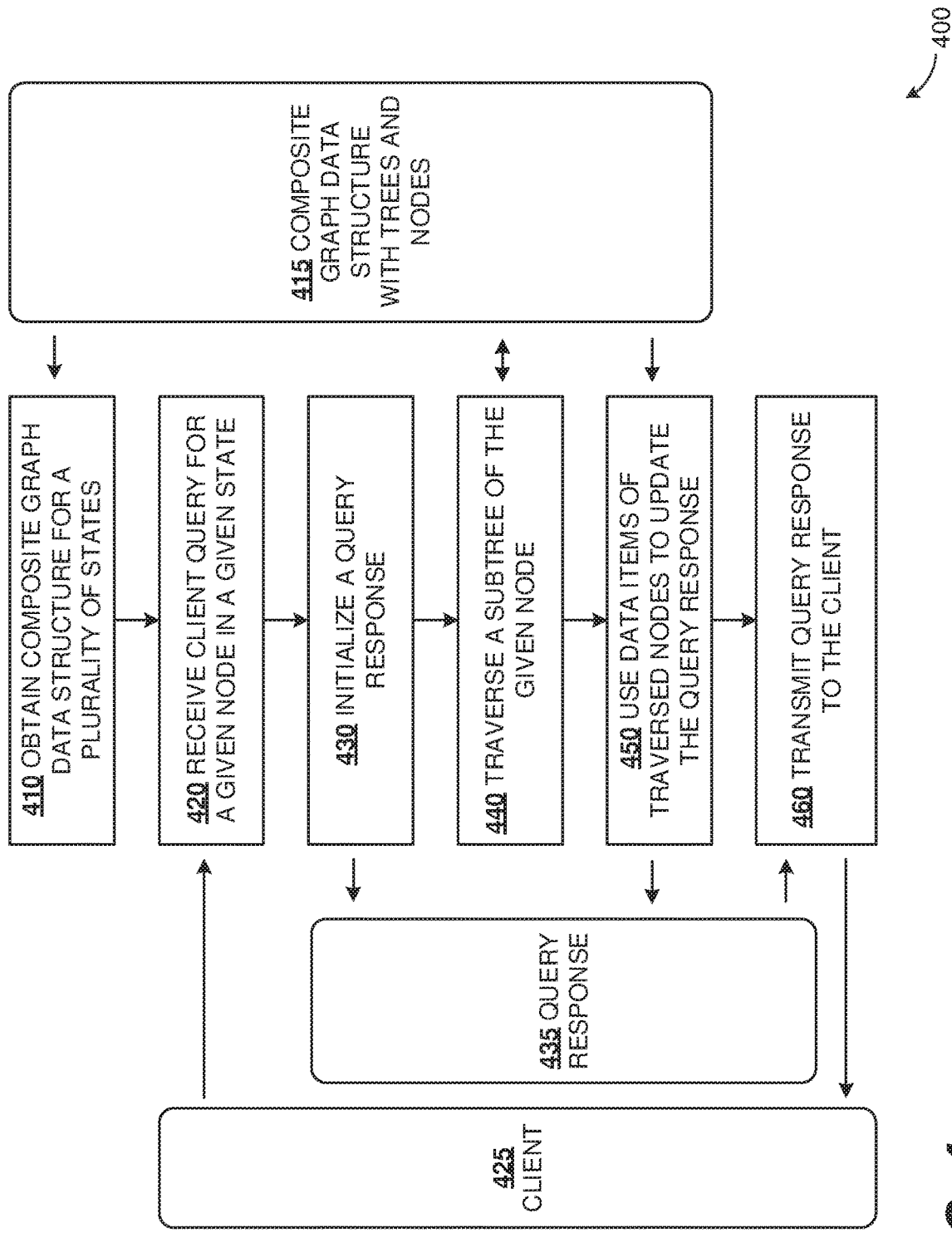
FIG. 4 is a flowchart of an example method for processing a request according to the disclosed technologies.

FIG. 4 is a flowchart 400 of another example method for processing a request with a composite graph data structure incorporating multiple states. Flowchart 400 is organized similarly to flowchart 100, and considerations described for various blocks of flowchart 100 are likewise applicable to similar blocks of flowchart 400. Further, flowchart 400 is described in context of a client 425, a response 435, and a composite graph data structure 415, which are generally similar to their counterparts in FIG. 1. However, the methods have some significant differences. Particularly, the method of FIG. 4 can be applied to a query on a given node asking about attributes inherited from the subtree beneath the given node in the tree, i.e. from the given node downward to all its descendant leaf nodes. The scope of such a query can extend to include the given node itself.

At process block 410, a composite graph data structure 415, for multiple states of a system, is received. That is, data structure 415 can be formed prior to commencement of flowchart 400. For each state, the primary nodes can be organized as respective rooted trees, each of which can be contained within the composite graph data structure 415. At process block 420, a query for a given primary node of the data structure 415 is received from client 425. The query can be directed, expressly or implicitly, to one or more given states of the data structure 415. For simplicity, the description proceeds for a single given state. The given primary node can be other than a leaf node for the particular (constituent) tree of the given state.

Responsive to the query, a response 435 can be initialized at process block 430. At process block 440, the primary nodes of a subtree of the given node can be traversed. In varying examples, the traversal can cover the given node's subtree in the primary graph corresponding to the given state, and can be breadth-first or depth-first. At process block 450, attribute values or other data items of the traversed nodes can be used to update the response 435, by building a response set 435, by summing data items into a response count 435, or otherwise applied to form the response 435. Process blocks 440, 450 can be performed concurrently, in lockstep. Finally, after completion of process blocks 440, 450, the query response 435 can be transmitted to client 425, at process block 460.

Example Graphs for Second Method

Figure 5A:
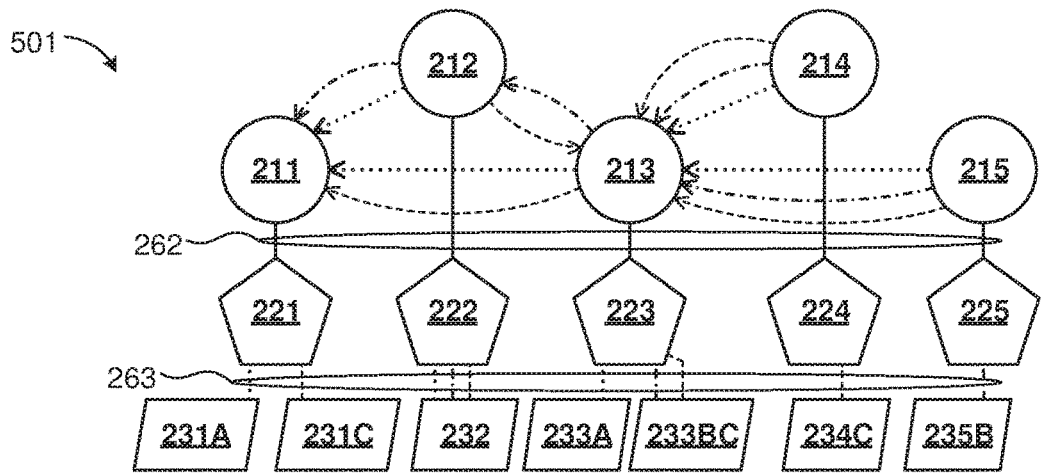
FIGS. 5A-5C are diagrams illustrating further graphs of systems according to the disclosed technologies.
Figure 5B:
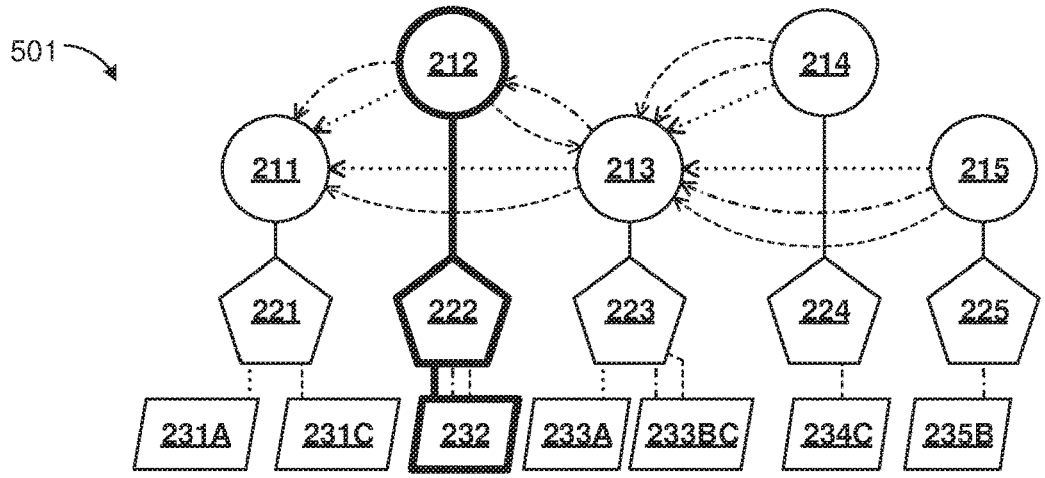
Figure 5C:
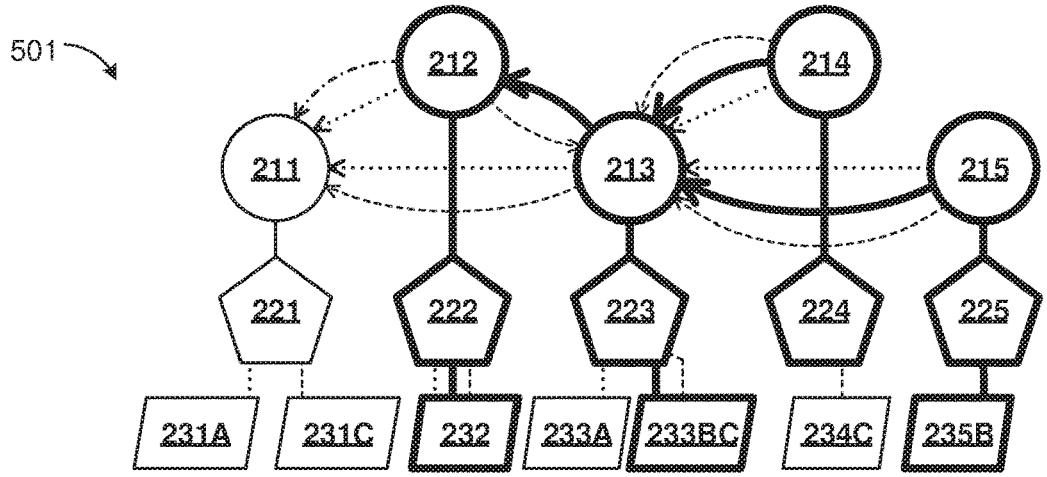

FIGS. 5A-5C are copies of composite graph 501 representing an example system illustrating the second method. The illustrated system has five primary nodes 211-215 with three states (State-1, State-2, State-3) arranged as rooted trees similar to trees 201-203 of FIGS. 2A-2C. Composite graph 501 also includes attribute nodes 221, 223 with value nodes 231A, 231C, 233A, 233BC as shown in graph 205. However, graph 501 also includes attribute nodes 222, 224-225 with value nodes 232, 234C, 235B, which distinguish graph 501 from graph 205. Thus, in graph 501, every primary node has at least one associated attribute. Value 232 is applicable to attribute 222 in all states State-1, State-2, State-3, while values 234C, 235B are respectively applicable to attributes 224, 225 in State-3 and State-2 only, leaving attribute 224 undefined in States 1 and 2, and leaving attribute 225 undefined in States 1 and 3. The states associated with the illustrated system, and the notation of dotted, dash-dot, and dashed lines are the same as for FIGS. 2A-2G.

FIG. 5A shows the composite graph 501 without emphasis. The multiple secondary nodes 221-225 of graph 501 are directly coupled to respective primary nodes 211-215 by respective by edges 262, and each secondary node 221-225 can represent an attribute of its respective primary node 211, 213. The edges 262 can be applicable for all states. The graph illustrated in FIG. 5A has multiple value nodes 231A-235B directly coupled to respective secondary nodes 221-225 by respective by value edges 263. Each value node 231A-235B can represent a value, for one or more states, of the attribute represented by respective coupled secondary node 221-225. In graph 501, every attribute node has at least one value defined for at least state. However, this is not a requirement, and in other examples, one or more attribute nodes can have no values assigned. In further examples, every attribute node of a composite graph can have a defined value for every defined state.

FIGS. 5B-5C illustrate handling of queries according to the second method described in context of FIG. 4. The query of FIG. 5B can be "count all personnel in node 212's subtree for State-1." In this illustration, all attributes 221-225 can be "personnel count." The graph 501 of FIG. 5B is unchanged from FIG. 5A, however for purpose of illustration, the nodes and edges relevant to this query have been shown with bold solid lines. Because node 212 is a leaf node in State-1, its subtree is just node 212 itself. Accordingly, the result for the query can be R5=N232.

The query of FIG. 5C can be "count all personnel in node 212's subtree for State-2." The subtree of node 212 in State-2 includes the four nodes 212-215. The contributing edges and nodes are shown in bold solid lines in FIG. 5C, and the result can be expressed as R6=N232+N233BC+ N235B. Although the traversal can encounter attribute 224 of primary node 214, this attribute has no defined value for State-2, and accordingly can be excluded from the result R6. Traversal of the primary subtree of a queried node can be performed according to block 440, as a top-down traversal in either depth-first or breadth-first fashion, and can extend to all leaf nodes descended from the queried node.

Many other queries can be handled within the scope of the second method. The query can specify root node 211, to count or aggregate an entire tree. The query can specify more than one state, for example "count all personnel in node 212's subtree for State-1 and State-2." In this case, the traversing and counting can be performed as described above for blocks 440, 450 for each of State-1 and State-2, and the combined result can be presented as a set R7:

$$R7 = \left\{ \begin{array}{l} \langle \text{State-1 } R5 \rangle; \\ \langle \text{State-2 } R6 \rangle \end{array} \right\} \quad (5)$$

where R5 and R6 are the numerical counts obtained for the individual states. Instead of counting, the query can require aggregation of attribute values, with results presented as a set similar to e.g. R2.

The method of FIG. 2 can be implemented with numerous additional extensions or variations. For example, the query can specify a criterion or filter that limits the attributes, values, or nodes that contribute to the result. Such a criterion or filter can be incorporated into one or both of process blocks 240, 250. To illustrate, the query can indicate that only one particular attribute (e.g. "Capacity") is to be collected, or that only values within a specified range are of interest, or that only nodes of class "Platoon" are of interest. In the latter case, traversal of a battalion's entire subtree can be performed at block 240, but nodes of class "Company" or "Battalion" can be skipped over at block 250.

Example Modular Software Implementation

Figure 6:
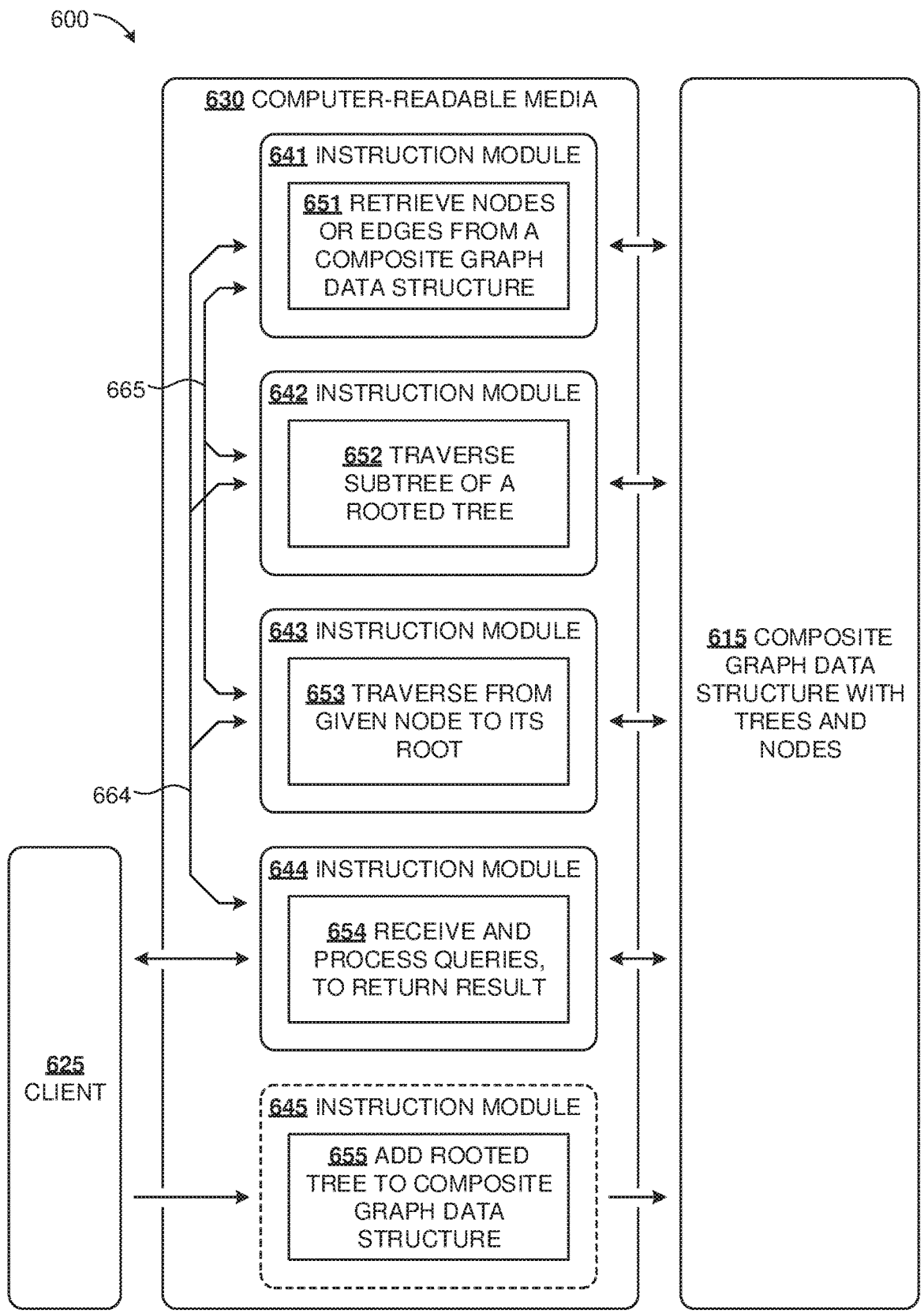
FIG. 6 is a diagram illustrating a modular example implementation of the disclosed technologies.

FIG. 6 is a diagram 600 illustrating a modular example software implementation of the disclosed technologies, with instruction modules 641-644 stored on computer-readable media 630. Additional software modules can optionally be included, such as instruction module 645 described below. The composite graph data structure 615 and client 625 can play similar roles as their counterparts in other examples discussed herein.

Instruction module 641, when executed on one or more hardware processors, can perform operations 651 to retrieve nodes or edges from composite graph data structure 615. Instruction module 642, upon execution, can perform operations 652 to traverse a subtree of a rooted tree, similar to operations described in context of process block 440. Instruction module 643, upon execution, can perform operations 653 to traverse a succession of nodes from a given node to its root, similar to operations described in context of process block 140. Instruction module 644, when executed, can perform operations 654 to receive and process queries, and subsequently return a result, similar to operations described in context of process blocks 120-160 or 420-460. Bidirectional arrows 664 indicate that instruction module 644 can in turn invoke instructions of any of modules 641-643. For example, module 642 can be invoked in cases where a query can be processed with a subtree or top-down traversal, or module 643 can be invoked in cases where a query can be processed with an inheritance path or bottom-up traversal. In turn, modules 642-643 can invoke instructions of module 641 as indicated by arrows 665.

Optional instruction module 645 can support dynamic evolution of composite graph data structure 615. Responsive to a request from client 625, module 645 can cause operations 655 to be performed, to add a new rooted tree (for a new state) to the composite graph data structure 615. In some examples, media 630 can include instructions to implement an application programming interface (API) for the composite graph data structure 615.

Example Applications

Table 6 illustrates some usage scenarios for the disclosed technology for a military organization, a manufacturing plant, or a communication network. A military organization can be organized hierarchically. For example, an infantry battalion can include one or more companies, and each company can include one or more platoons. However, the battalion can have various states dependent on combat readiness (e.g. peacetime, on alert, or active). The states can depend on other parameters, such as a locale or theater (e.g. domestic, Atlantic, or Pacific), or time (e.g. before 2019; Jan. 1, 2019 through Dec. 31, 2019; current time; or after Dec. 31, 2025). The constituent platoons and companies can be organized differently according to the various states. The values of various attributes can also be state-dependent.

In another application, a manufacturing plant can be organized to produce product assemblies from one or more subassemblies, each having a sequence of operations that can be performed by respective manufacturing stations or machines. Each subassembly can itself be further composed of multiple modules, which can have submodules, and so forth, so that the workflow for a final product assembly can be a multi-level hierarchy. States of the modeled system can be according to the final manufactured product assembly. For example, an automobile plant can manufacture 2-door or 4-door variants of a particular brand of automobile. The plant organization for the 4-door model can require twice as many stations for manufacturing door subassemblies as compared to the 2-door model, in order to maintain a target rate of production. Further, the states can vary according to time of year, with winter tires and lower viscosity engine oil used for vehicles likely to be sold in winter months. The state can also vary according to a target production rate.

A communication network can also be organized hierarchically, with customer sites connecting to points of presence of a local provider at Tier-3, thence to a network aggregator at Tier-2, and trunk nodes at Tier-1. Similar organizations can be used for wireless, wired, optical, telephony, or mixed mode networks. For such networks, it can be desirable to adapt the organization according to time of day, or occurrence of special events. For example, Tier-2 and Tier-3 resources in commercially zoned areas can experience very light traffic during evenings and weekends, while residentially zoned areas can experience light traffic during workday hours. Accordingly, it can be desirable to reorganize connectivity to provide better utilization of resources and alleviate network congestion. Further, a wireless communication network can include portable base stations to serve special events, such as football games. How the portable base stations are integrated into e.g. Tier-2 facilities can be dependent on locations, times, and anticipated network traffic for such special events. Accordingly, additional states for the modeled network can be introduced into a graph data structure representing the communication network.

Each block of Table 6 pertains to one application, and the columns provide examples of primary, secondary, and value nodes for a modeled system. Each block is subdivided into rows for respective example nodes. The first column lists state classifiers rather than example states per se. That is, each modeled system can have a range of states for different values of each state classifier, and the actual modeled states can variously support different combinations of values of the respective state classifier. The examples of primary nodes can also represent classes of nodes, and an instance of a modeled system can have any number of each class of node. Where the overall modeled system has e.g. multiple battalions, there can be an additional root node (not shown), under which the various battalions, with their interchangeable resources, can be organized. The attributes and values are also exemplary. Some attributes (e.g. Commanding Officer, Takt time, or Capacity) can be common across multiple classes or all primary nodes of a modeled system, while other attributes (e.g. Notice to Move, can be specific to a particular class of primary node, or, in some examples, even to a particular instance of a primary node.

TABLE 6

| State Classifier | Modeled System | Primary Node | Attribute and Value |
|---|---|---|---|
| Combat Readiness | Military Organization | Battalion | Notice to Move = 3 days Commanding Officer ("CO") = Maj. Smith |
| Locale / Theater | | Company | Supplier = Acme Corp. CO = Capt. Johnson |
| Time Period | | Platoon | Troop strength = 25 CO = Lt. Williams |
| Final Product Brand and Variant | Manufacturing Plant | Product Quality Assurance | Staff Strength = 3 Takt time = 15 minutes Tests = {Emission, electrical, engine} |
| Target Production Rate | | Final Assembly | Staff Strength = 15 Takt time = 2 hours |
| Season | | Door Subassembly | Staff Strength = 4 Takt time = 22 min. Paint colors = {Blue, Green, Red} |
| | | Engine Subassembly | Staff Strength = 9 Takt time = 1.4 hour Oil viscosity = 10 W-30 |
| | | Wheel Subassembly | Staff Strength = 2 Takt time = 14 minutes Tire supplier = Bigstone |
| Time of Day | Communication Network | Tier-1 Trunk Router | Capacity = 1 Tbps Location = "San Jose, CA" Staff = 2 |
| System Maintenance | | Tier-2 Network Aggregator | Capacity = 100 Gbps Location = "Sacramento, CA" Operating mode = Remote management |

TABLE 6-continued

| State Classifier | Modeled System | Primary Node | Attribute and Value |
|---|---|---|---|
| Special Event | | Tier-3 Point of Presence | Capacity = 10 Gbps Location = "Davis, CA" |

The applications and items listed in Table 6 are exemplary.

Further Implementation Examples

Software tools to implement the disclosed technologies can be incorporated into an S/4 HANA environment, using facilities such as S/4 HANA Defense and Security product, NetWeaver Application Server, ABAP programming environment, ABAP managed database procedures (AMDP), the ABAP Core Data Services (CDS) ecosystem, HANA Graph Engine, HANA Cypher Query, or Fiori user experience launchpad.

A Generalized Computer Environment

Figure 7:
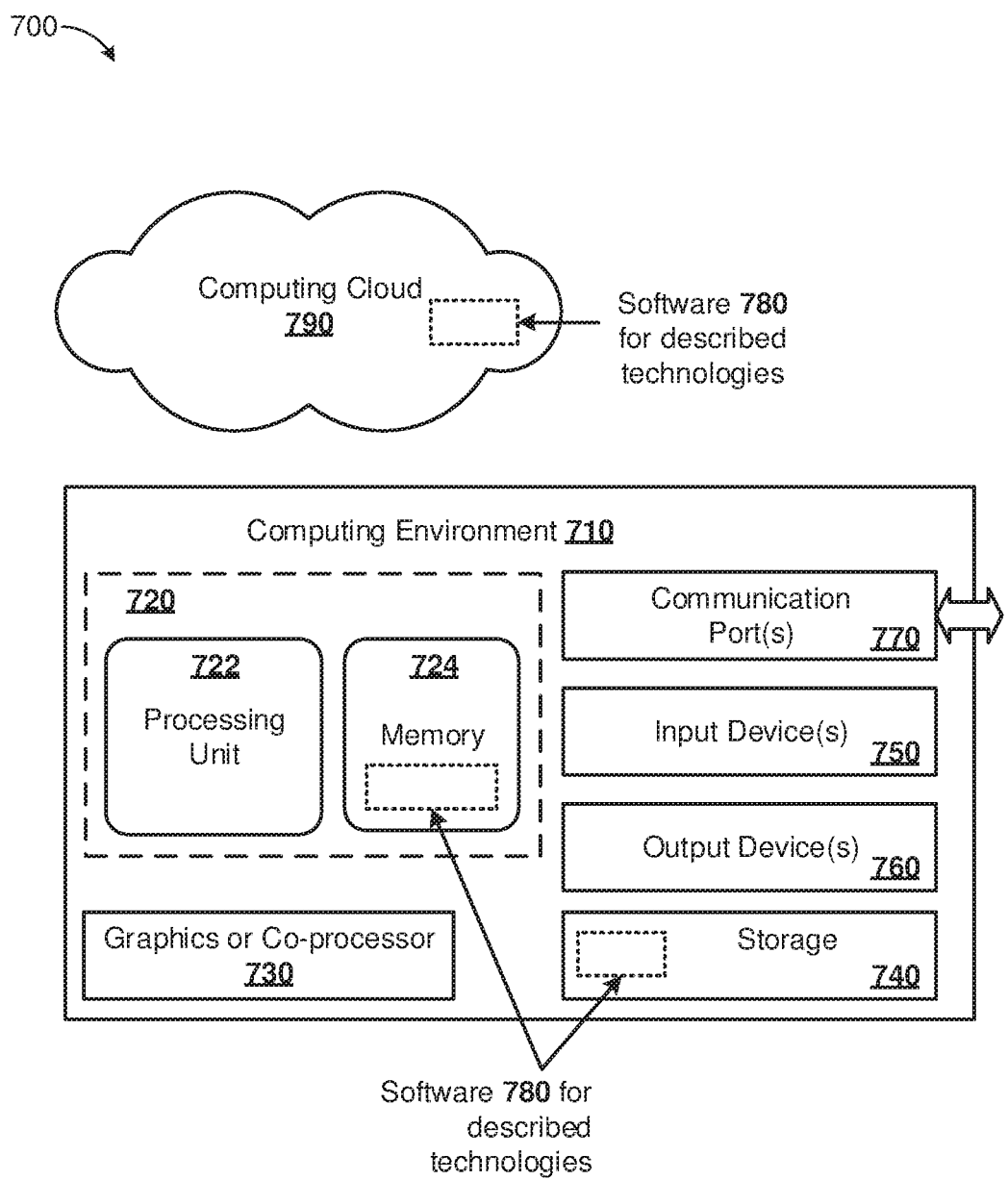
FIG. 7 is a diagram schematically depicting a computing environment suitable for implementation of disclosed technologies.

FIG. 7 illustrates a generalized example of a suitable computing system 700 in which described examples, techniques, and technologies, including construction, deployment, operation, query processing, and maintenance of a composite graph data structure or dynamic rooted trees according to disclosed technologies can be implemented. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing queries on a composite graph data structure representing a dynamic system, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
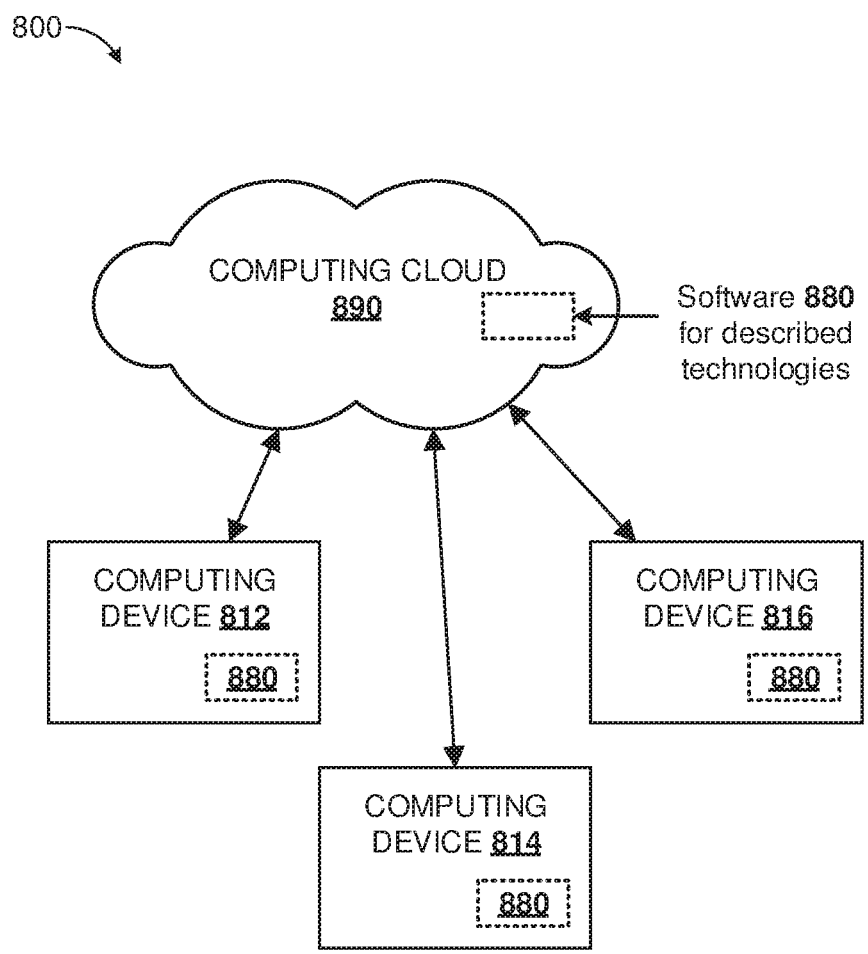
FIG. 8 is a diagram schematically depicting computing devices operating in conjunction with a computing cloud for implementation of disclosed technologies.

FIG. 8 depicts an example cloud computing environment 800 in which the described technologies can be implemented. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries).

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

GENERAL CONSIDERATIONS

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add," "aggregate," "apply," "build," "calculate," "call," "collect," "configure," "couple," "define," "delete," "determine," "find," "form," "generate," "initialize," "invoke," "issue," "obtain," "overlay," "perform," "process," "receive," "remove," "request," "return," "retrieve," "send," "set," "share," "store," "sum," "transmit," "travel," "traverse," "update," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 724, and storage 740. The term computer-readable storage media does not include signals and carrier waves. In addition, the term computer-readable storage media does not include communication ports (e.g., 770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
   for a system comprising a plurality of components, the system reconfigurable among a plurality of states having respective relationships among the components, building a composite graph data structure representing the system, wherein:
   the components are represented by respective nodes (denoted component-representing nodes) of the composite graph data structure;
   the relationships are represented as edges of a distinct respective tree, embedded within the composite graph data structure, for each of the states;
   each of the trees has a same number of nodes, which are the component-representing nodes, and further each of the trees is formed of (i) the same component-representing nodes as any other of the trees and (ii) the edges representing the relationships of the respective state; and
   the nodes are associated with data items which are values of respective attributes of the nodes;
   receiving, from a first client, a first query for a first node of the nodes in a first state of the states, wherein the first node is not a root of the respective tree of the first state;
   initializing a first query response;
   traversing a first inheritance path of the first node in the respective tree of the first state within the composite graph data structure, wherein the first inheritance path comprises a first group of the nodes;
   using the data items associated with the first group of the nodes to update the first query response;
   transmitting the first query response to the first client;
   receiving, from a second client, a second query for a second node of the nodes in a second state of the states, wherein the second node is not a root of the respective tree of the second state and the second state is distinct from the first state;
   initializing a second query response;

traversing a second inheritance path of the second node in the respective tree of the second state within the composite graph data structure, wherein the second inheritance path comprises a second group of the nodes;

using the data items associated with the second group of the nodes to update the second query response; and transmitting the second query response to the second client.

2. The computer-implemented method of claim 1, wherein the first group of the nodes is traversed in order from the first node to the root.

3. The computer-implemented method of claim 1, wherein the trees share a common root node.

4. The computer-implemented method of claim 1, wherein the nodes are primary nodes, and wherein the composite graph data structure contains a plurality of secondary nodes directly coupled by secondary edges to respective nodes of the primary nodes.

5. The computer-implemented method of claim 4, wherein the secondary edges are independent of the states.

6. The computer-implemented method of claim 4, wherein each of the secondary nodes represents an attribute of the primary node to which the each secondary node is directly coupled.

7. The computer-implemented method of claim 6, wherein the composite graph data structure further comprises a plurality of value nodes directly coupled by value edges to respective ones of the secondary nodes, and each of the value nodes represents a value of the attribute represented by the secondary node to which the each value node is directly coupled.

8. The computer-implemented method of claim 7, wherein at least two of the value edges are dependent on the states.

9. The computer-implemented method of claim 1, wherein the first query response comprises a set, and the updating the first query response aggregates the data items associated with the first group of the nodes into the set.

10. The computer-implemented method of claim 1, wherein the first query extends to additional states of the plurality of states besides the first state, and the method further comprises traversing additional inheritance paths associated with the other states.

11. One or more computer-readable media storing instructions which, when executed by one or more hardware processors, cause the hardware processors to perform actions comprising:

for a system comprising a plurality of components, the system reconfigurable among a plurality of states having respective relationships among the components, receiving a composite graph data structure representing the system, wherein:

the components are represented by respective nodes (denoted component-representing nodes) of the composite graph data structure;

the relationships are represented as edges of a distinct respective tree, embedded within the composite graph data structure, for each of the states;

each of the trees has a same number of nodes, which are the component-representing nodes, and further each of the trees is formed of (i) the same component-representing nodes as any other of the trees and (ii) the edges representing the relationships of the respective state; and the nodes are associated with data items which are values of respective attributes of the nodes;

receiving, from a first client, a first query for a first component of the system in a first state of the system, wherein the first component is represented by a first node of the nodes that is not a leaf of the respective tree of the first state;

initializing a first query response;

traversing a first subtree, of the respective tree of the first state in the composite graph data structure, rooted at the first node;

using the data items associated with respective nodes of the nodes of the first subtree to update the first query response;

transmitting the first query response to the first client;

receiving, from a second client, a second query for a second component of the system in a second state of the system, wherein the second component is represented by a second node of the nodes that is not a leaf of the respective tree of the second state;

initializing a second query response;

traversing a second subtree, of the respective tree of the second state in the composite graph data structure, rooted at the second node;

using the data items associated with respective nodes of the nodes of the second subtree to update the second query response; and transmitting the second query response to the second client.

12. The one or more computer-readable media of claim 11, wherein the trees share a common root node.

13. The one or more computer-readable media of claim 11, wherein the given node is a root of the respective tree of the given state.

14. The one or more computer-readable media of claim 11, wherein:

the nodes are primary nodes;

the composite graph data structure contains a plurality of secondary nodes directly coupled by secondary edges to respective nodes of the primary nodes;

the secondary edges are independent of the states; and each of the secondary nodes represents an attribute of the primary node to which the each secondary node is directly coupled.

15. The one or more computer-readable media of claim 14, wherein:

the composite graph data structure further comprises a plurality of value nodes directly coupled by value edges to respective ones of the secondary nodes;

each of the value nodes represents a value of the attribute represented by the secondary node to which the each value node is directly coupled; and at least two of the value edges are dependent on the states.

16. The one or more computer-readable media of claim 11, wherein the query response is a count, and the using sums the data items into the count.

17. A computing system comprising:

one or more hardware processors with memory coupled thereto;

computer-readable media storing instructions executable by the one or more hardware processors, the stored instructions comprising:

first instructions that, when executed, cause receipt of a composite graph data structure representing a reconfigurable system, wherein:

the reconfigurable system has a plurality of states with respective relationships among the components;

the components are represented by respective nodes (denoted component-representing nodes) of the composite graph data structure;

the relationships are represented as edges of a distinct respective tree, embedded within the composite graph data structure, for each of the states; and each of the trees has a same number of nodes, which are the component-representing nodes, and further each of the trees is formed of (i) the same component-representing nodes as any other of the trees and (ii) the edges representing the relationships of the respective state;

second instructions that when executed, cause the one or more hardware processors to perform operations comprising:

receiving, from a first client, a first query for a first node of the nodes in a first state of the states, wherein the first node is not a root of the respective tree of the first state;

initializing a first query response;

traversing a first inheritance path of the first node in the respective tree of the first state within the composite graph data structure, wherein the first inheritance path comprises a first group of the nodes;

using the data items associated with the first group of the nodes to update the first query response;

transmitting the first query response to the first client;

receiving, from a second client, a second query for a second node of the nodes in a second state of the states, wherein the second node is not a root of the respective tree of the second state and the second state is distinct from the first state;

initializing a second query response;

traversing a second inheritance path of the second node in the respective tree of the second state within the composite graph data structure, wherein the second inheritance path comprises a second group of the nodes;

using the data items associated with the second group of the nodes to update the second query response; and transmitting the second query response to the second client.

18. The computing system of claim 17, wherein the instructions further comprise:

third instructions to add a new tree, for a new state, to the composite graph data structure.

19. The computing system of claim 17, wherein the first and second states are for a common operating mode of the nodes at distinct respective times.

20. The computing system of claim 17, wherein the first and second states are for distinct respective operating modes of the nodes at a common time.

* * * * *